US012774888B2

(12) United States Patent
Chankaya

(10) Patent No.: US 12,774,888 B2
(45) Date of Patent: Oct. 27, 2026

(54) PRECISE LOCALIZATION AND MAPPING OF ALTITUDINAL SYSTEMS OVER DYNAMIC SURFACES

(71) Applicant: Lockheed Martin Corporation, Bethesda, MD (US)

(72) Inventor: Kurt M. Chankaya, Keller, TX (US)

(73) Assignee: Lockheed Martin Corporation, Bethesda, MD (US)

( * ) Notice: Subject to any disclaimer, the term of this patent is extended or adjusted under 35 U.S.C. 154(b) by 120 days.

(21) Appl. No.: 18/502,450

(22) Filed: Nov. 6, 2023

(65) Prior Publication Data

US 2025/0146821 A1 May 8, 2025

(51) Int. Cl.
*G01C 21/00* (2006.01)

(52) U.S. Cl.
CPC .................................. *G01C 21/005* (2013.01)

(58) Field of Classification Search
CPC .................................................... G01C 21/005
See application file for complete search history.

(56) References Cited

U.S. PATENT DOCUMENTS 4,829,304 A 5/1989 Baird
6,219,618 B1 * 4/2001 Bateman ................ G01C 5/005 701/13
7,522,090 B2 4/2009 Hawkinson
9,400,329 B2 7/2016 Pillay
2008/0278515 A1 * 11/2008 Gannon .................. G06T 17/05 345/593
2013/0325215 A1 * 12/2013 Vos ........................ G01C 11/02 701/450
2015/0268050 A1 * 9/2015 Laine ..................... G09B 29/10 703/2
2018/0313651 A1 * 11/2018 Laine ........................ G01S 5/16
2020/0226745 A1 * 7/2020 Adler ........................ G06T 7/73
2022/0107425 A1 4/2022 Hornsby et al.
2022/0221592 A1 * 7/2022 Kumar .................... G01S 13/86
2022/0317315 A1 10/2022 Cooper et al.

FOREIGN PATENT DOCUMENTS

CN 102426018 B 1/2014
CN 109596119 A 4/2019
EP 2133662 B1 2/2012

OTHER PUBLICATIONS

Extended European Search Report corresponding to European Patent Application No. 24210106.1, dated Apr. 8, 2025, 14 pages.

* cited by examiner

*Primary Examiner* — Jess Whittington
(74) *Attorney, Agent, or Firm* — Baker Botts L.L.P.

(57) ABSTRACT

A method for identifying a precise localization and mapping of an altitudinal system with respect to dynamic surfaces is presented. The method includes receiving a time-dependent map of a patch of a dynamic surface. The time-dependent map is captured by a first altitudinal system having a known location with respect to the dynamic surface. The method includes receiving a terrain map of a first set of terrain features of the patch of the dynamic surface. The terrain map is captured by a second altitudinal system having an approximate location with respect to the dynamic surface. The method includes comparing the first set of terrain features to a second set of terrain features stored in a database, and identifying, based on the comparison of the first set of terrain features and the second set of terrain features, a precise location of the second altitudinal system with respect to the dynamic surface.

17 Claims, 4 Drawing Sheets

PRECISE LOCALIZATION AND MAPPING OF ALTITUDINAL SYSTEMS OVER DYNAMIC SURFACES

TECHNICAL FIELD

This disclosure relates generally to altitudinal systems, and, more specifically, to the precise localization and mapping of altitudinal systems over dynamic surfaces.

BACKGROUND

Position, navigation, and timing (PNT) systems may generally include three distinct systems suitable for positioning and tracking various mobile components and systems. For example, the PNT system may include a positioning system, which may be suitable for accurately and precisely determining a location and an orientation of one or more mobile components and systems. Similarly, the PNT system may include a navigation system, which may be suitable for accurately and precisely determining a current position of one or more mobile components and systems and directing the one or more mobile components and systems to a desired position. Lastly, the PNT system may include a timing system, which may be suitable for maintaining accurate and precise time associated with one or more mobile components and systems.

However, traditional PNT systems rely on either reference to fixed ground objects or recognizable terrain features, celestial objects, or signals from constellations of navigation satellites. Such reliances lead to particular shortcomings. For example, some of these reliances cannot be used in all weather conditions or over regions lacking in fixed objects for reference. Moreover, reliance on satellite systems may be subject operational regulations. Lastly, inertial based systems have increasing errors with time and are not suitable for long distance navigation without occasional correction.

DESCRIPTION OF EXAMPLE EMBODIMENTS

Overview

Figure 1:
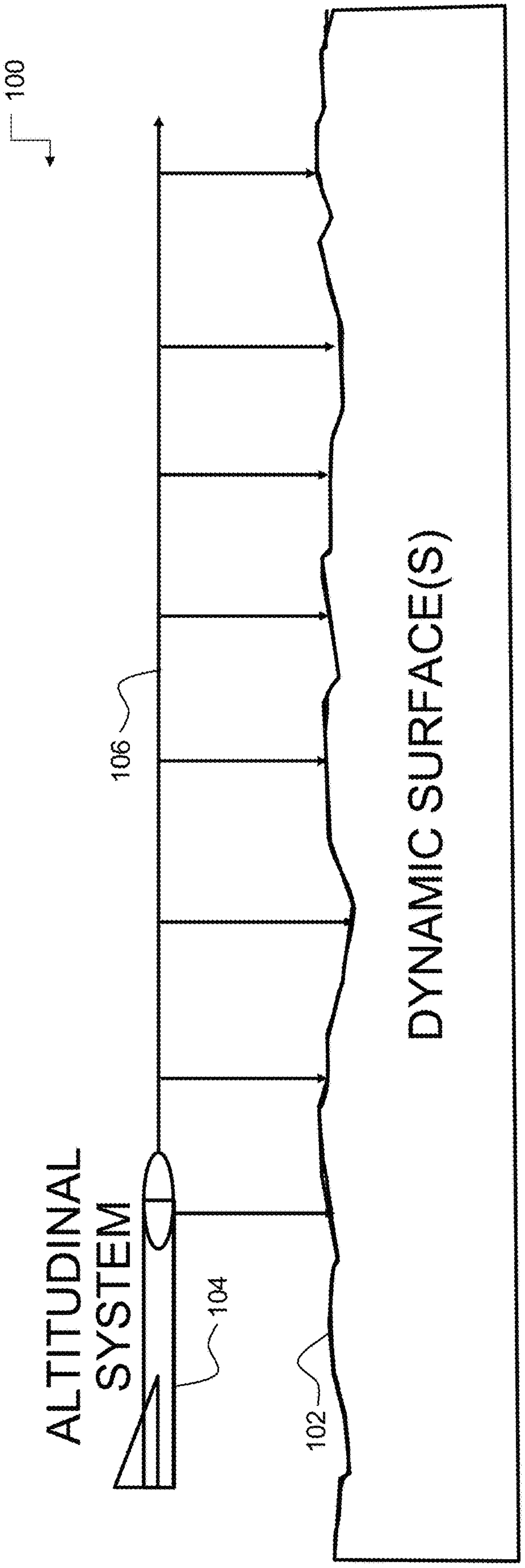
FIG. 1 illustrates an example altitudinal system and dynamic surface environment.

The present embodiments are directed to techniques for identifying a precise localization and mapping of an altitudinal system with respect to dynamic surfaces. In particular embodiments, one or more computing devices may receive a time-dependent map of a patch of a dynamic surface. For example, in one embodiment, the time-dependent map may be captured by a first altitudinal system having a known location with respect to the dynamic surface. In particular embodiments, the first altitudinal system may include a satellite configured to capture the time-dependent map of the patch of the dynamic surface utilizing a synthetic aperture radar (SAR) system. In particular embodiments, the time-dependent map may include a time-dependent topographical map of an area of the dynamic surface over which the second altitudinal system is expected to be traversing.

In particular embodiments, the one or more computing devices may then receive a terrain map of a first set of terrain features of the patch of the dynamic surface. For example, in one embodiment, the terrain map may be captured by a second altitudinal system having an approximate location with respect to the dynamic surface. In particular embodiments, the second altitudinal system may include a guided projectile configured to measure the first set of terrain features of the patch of the dynamic surface when traversing thereover or thereon. In particular embodiments, the terrain map may be captured and measured utilizing an improved terrain contour matching (TERCOM) technique. In particular embodiments, the dynamic surface may include an ocean surface, an upper surface of clouds, a lower surface of clouds, a dessert surface, a beach surface, an upper surface of a forest, or an ice surface.

In particular embodiments, the one or more computing devices may compare the first set of terrain features to a second set of terrain features stored in a database associated with the one or more computing devices. In particular embodiments, prior to comparing the first set of terrain features to the second set of terrain features, the one or more computing devices may store the second set of terrain features to the database. For example, in one embodiment, the second set of terrain features may include a plurality of micro-terrain features of the dynamic surface captured over a period of time. In particular embodiments, the one or more computing devices may then identify, based on the comparison of the first set of terrain features and the second set of terrain features, a precise location of the second altitudinal system with respect to the dynamic surface.

For example, in particular embodiments, the one or more computing devices may identify the precise location of the second altitudinal system with respect to the dynamic surface further by determining, based on the comparison of the first set of terrain features and the second set of terrain features, a match between the first set of terrain features and the second set of terrain features, and in response to determining the match, identifying the precise location of the second altitudinal system with respect to the dynamic surface. In particular embodiments, the one or more computing devices may determine the match between the first set of terrain features and the second set of terrain features by determining a match between the first set of terrain features and at least a subset of the second set of terrain features.

Technical advantages of particular embodiments of this disclosure may include one or more of the following. Certain systems and methods described herein provide a dynamic position, navigation, and timing (PNT) system for enabling precise localization and navigation over dynamic, transient surfaces (e.g., ocean surface, upper surface of clouds) in instances in which GPS or similar satellite or constellation-based navigation systems are unavailable. Specifically, a first altitudinal system, such as a terrestrial or extraterrestrial satellite, having a precise, known location is utilized as an anchor point (e.g., point of reference). The first altitudinal system, utilizing synthetic aperture radar (SAR) or other imaging system, captures a high-resolution, time-dependent topographical map of a patch of area of a dynamic, smooth surface (e.g., ocean surface, upper surface of clouds). The time-dependent topographical map of the patch of area of the surface corresponds to an area over which a second altitudinal system (e.g., an airplane, a jet, an unmanned aerial vehicle (UAV), a balloon, a projectile, a guided projectile, and so forth) is expected to be currently flying or otherwise traversing.

In particular embodiments, the second altitudinal system-having at least some knowledge of its own approximate location with respect to the dynamic surface-then measures the local terrain features (micro-terrain features) directly beneath the second altitudinal system (e.g., utilizing an improved terrain contour matching (TERCOM) technique). For example, the measured local terrain features (micro-terrain features) may include, for example, a laser altimeter reading of local wave heights or local wave patterns. The measured local terrain features (micro-terrain features) are then compared against previously-captured micro-terrain features stored in a database. The precise location (e.g., its precise location with respect to a particular area of the ocean or cloud path) of the second altitudinal system may then be determined by matching the measured local terrain features (micro-terrain features) to at least a subset of the previously-captured micro-terrain features stored in the database.

In this way, the present techniques may identify a precise localization and mapping of the second altitudinal system even as the second altitudinal system traverses over dynamic surfaces, such as the vast oceans and clouds by which the second altitudinal system may travel. Specifically, because ocean and cloud features are dynamic transient, the present embodiments include utilizing an improved TERCOM technique to generate a temporary map of these dynamic, transient surfaces that may be utilized for precise localization and mapping and navigational purposes.

Other technical advantages will be readily apparent to one skilled in the art from the following figures, descriptions, and claims. Moreover, while specific advantages have been enumerated above, various embodiments may include all, some, or none of the enumerated advantages.

EXAMPLE EMBODIMENTS

FIG. 1 illustrates an example altitudinal system and dynamic surface environment 100, in accordance with the presently disclosed embodiments. In particular embodiments, the example altitudinal system and surface environment 100 may include a dynamic surface 102 and altitudinal system 104, which may fly a flightpath 106 over the surface 102. In particular embodiments, the dynamic surface 102 may include, for example, an ocean surface, an upper surface of clouds, a lower surface of clouds, a dessert surface, a beach surface, an upper surface of a forest, or other dynamic, transient surfaces in which global positioning systems (GPS) or similar satellite or constellation-based navigation systems may be unsuitable for localization and mapping of the altitudinal system 104 due to the dynamic and dynamic nature of the dynamic surface 102. In particular embodiments, the altitudinal system 104 may include, for example, an airplane, a jet, a helicopter, a glider, an unmanned aerial vehicle (UAV), a balloon, a projectile, a guided projectile, or other altitudinal system that may be suitable for flying the flightpath 106 over the dynamic surface 102.

Figures 2A, 2B, 2C:
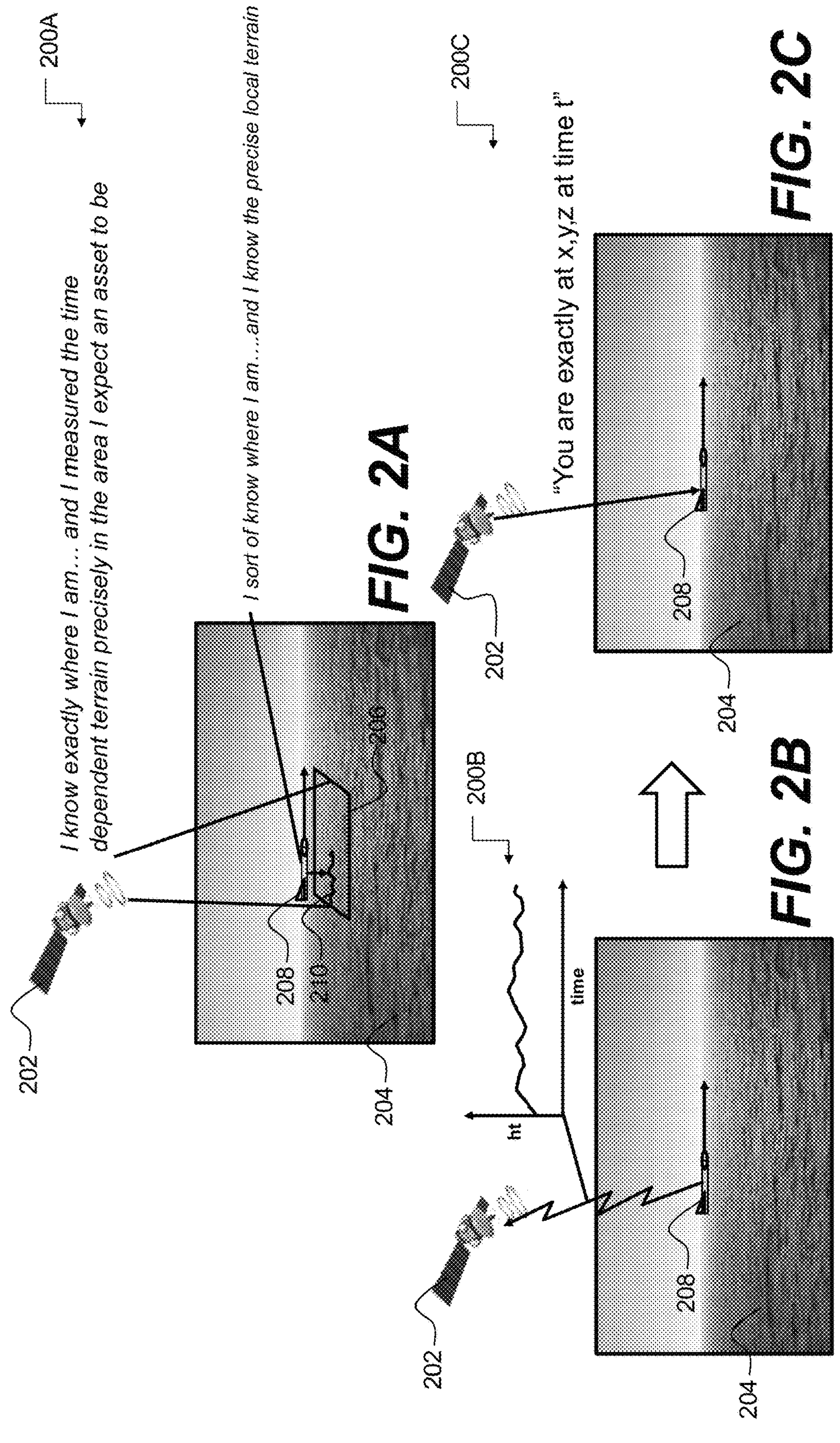
FIGS. 2A-2C illustrate running examples for identifying a precise localization and mapping of an altitudinal system during flight over dynamic surfaces.

FIGS. 2A-2C illustrate running examples 200A, 200B, and 200C for identifying a precise localization and mapping of an altitudinal system during flight over dynamic surface, in accordance with the presently disclosed embodiments. As depicted by FIGS. 2A-2C, in particular embodiments, a first altitudinal system 202, such as a terrestrial or extraterrestrial satellite, having a precise, known location may be utilized as an anchor point (e.g., point of reference) with respect to a dynamic surface 204. In particular embodiments, the first altitudinal system 202 may utilize synthetic aperture radar (SAR) or other similar imaging system to capture a high-resolution, time-dependent topographical map of a patch 206 of the dynamic surface 204 (e.g., an ocean surface, an upper surface of clouds, a lower surface of clouds, a dessert surface, a beach surface, an upper surface of a forest, an ice surface). In particular embodiments, the time-dependent topographical map of the patch 206 of the dynamic surface 204 as captured by the first altitudinal system 202 may correspond to an area over which a second altitudinal system 208 (e.g., an airplane, a jet, a helicopter, a glider, a UAV, a balloon, a projectile, a guided projectile, and so forth) may be expected to be flying or otherwise traversing at a given time.

In particular embodiments, the second altitudinal system 208 may have at least some knowledge of its own approximate location with respect to the dynamic surface 204. For example, in particular embodiments, even with some minimal drift errors, the second altitudinal system 208 may have at least an unprecise indication of its own approximate location with respect the dynamic surface 204 based on, for example, on the planned flightpath 106 of the second altitudinal system 208. In particular embodiments, the second altitudinal system 208 may then utilize an improved terrain contour matching (TERCOM) technique to capture and measure the local terrain features 210 (e.g., micro-terrain features) directly beneath the second altitudinal system 208 as the second altitudinal system 208 flies over the dynamic surface 204, and, more precisely, the patch 206 of the dynamic surface 204.

For example, in particular embodiments, the local terrain features 210 (e.g., micro-terrain features) as captured and measured by the second altitudinal system 208 may include, for example, a laser altimeter reading or a transceiver detection of local wave heights, local wave patterns, local cloud patterns, local cloud features, local sand patterns, local ice features, and so forth. In particular embodiments, the captured and measured local terrain features 210 (e.g., micro-terrain features) may be then compared against a historical data set of previously-captured micro-terrain features. For example, in one embodiment, the historical data set of previously-captured micro-terrain features may include an improved TERCOM data capture over some period of time (e.g., minutes, hours, days, months, years) and stored, for example, in a database associated with one or more of the first altitudinal system 202 or the second altitudinal system 208.

In accordance with the presently disclosed embodiments, the precise location, position, and orientation of the second altitudinal system 208 at a given time T may then be identified by matching the captured and measured local terrain features 210 (e.g., micro-terrain features) to at least a subset of the historical data set of previously-captured micro-terrain features stored in the database. Specifically, in accordance with the presently disclosed embodiments, the computing system (e.g., computing system 400 as discussed below with respect to FIG. 4) may identify the precise location, position, and orientation of the second altitudinal system 208 with respect to a particular area or patch of the dynamic surface 204 at a given time T and as identified by its XYZ coordinates in three-dimensional (3D) space.

In this way, the present techniques may identify a precise localization and mapping of the second altitudinal system 208 even as the second altitudinal system 208 traverses over dynamic surfaces, such as the vast oceans and clouds by which the second altitudinal system 208 may travel. Specifically, because ocean and cloud features are dynamic transient, the present embodiments include utilizing an improved TERCOM technique to generate a temporary map of these dynamic, transient surfaces that may be utilized for precise localization and mapping and navigational purposes.

Figure 3:
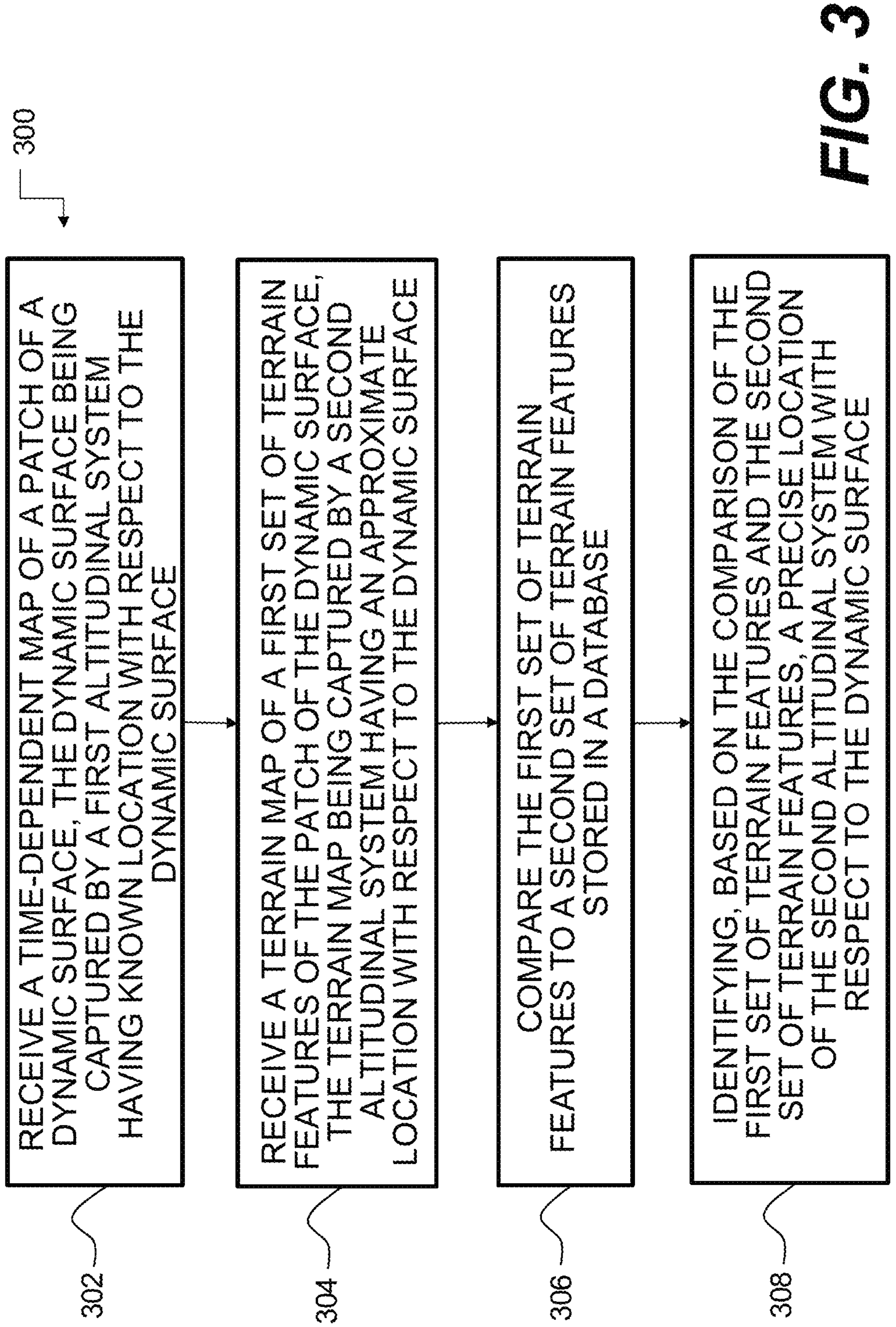
FIG. 3 illustrates a flow diagram of a method for identifying a precise localization and mapping of an altitudinal system with respect to dynamic surfaces.

FIG. 3 illustrates a flow diagram of a method 300 for identifying a precise localization and mapping of an altitudinal system with respect to dynamic surfaces, in accordance with the presently disclosed embodiments. The method 300 may be performed utilizing one or more computing devices (e.g., computing system 400) including one or more processors (e.g., processors 402) that may include hardware (e.g., a general purpose processor, a graphic processing units (GPU), an application-specific integrated circuit (ASIC), a system-on-chip (SoC), a microcontroller, a field-programmable gate array (FPGA), or any other processing device(s) that may be suitable for processing intents and/or desire states), software (e.g., instructions running/executing on one or more processors), firmware (e.g., microcode), or any combination thereof. In particular embodiments, the one or more computing devices (e.g., computing system 400) may be onboard the first altitudinal system 202, onboard the second altitudinal system 208, or may otherwise be included as part of one or more centralized or decentralized servers remote from the first altitudinal system 202 and the second altitudinal system 208.

The method 300 may begin at block 302 with the one or more computing devices receiving a time-dependent map of a patch of a dynamic surface. In particular embodiments, the time-dependent map may be captured by a first altitudinal system having a known location with respect to the dynamic surface. The method 300 may continue at block 304 with the one or more computing devices receiving a terrain map of a first set of terrain features of the patch of the surface. In particular embodiments, the terrain map may be captured by a second altitudinal system having an approximate location with respect to the dynamic surface.

The method 300 may continue at block 306 with one or more computing devices comparing the first set of terrain features to a second set of terrain features stored in a database associated with the one or more computing devices. For example, in particular embodiments, prior to comparing the first set of terrain features to the second set of terrain features, the one or more computing devices may store the second set of terrain features to the database, in which the second set of terrain features may include a plurality of micro-terrain features of the dynamic surface captured over a period of time. The method 300 may then conclude at block 308 with one or more computing devices identifying, based on the comparison of the first set of terrain features and the second set of terrain features, a precise location of the second altitudinal system with respect to the dynamic surface.

For example, in particular embodiments, the one or more computing devices may identifying the precise location of the second altitudinal system with respect to the dynamic surface further by determining, based on the comparison of the first set of terrain features and the second set of terrain features, a match between the first set of terrain features and the second set of terrain features, and in response to determining the match, identifying the precise location of the second altitudinal system with respect to the dynamic surface. In particular embodiments, the one or more computing devices may determining the match between the first set of terrain features and the second set of terrain features by determining a match between the first set of terrain features and at least a subset of the second set of terrain features.

Figure 4:
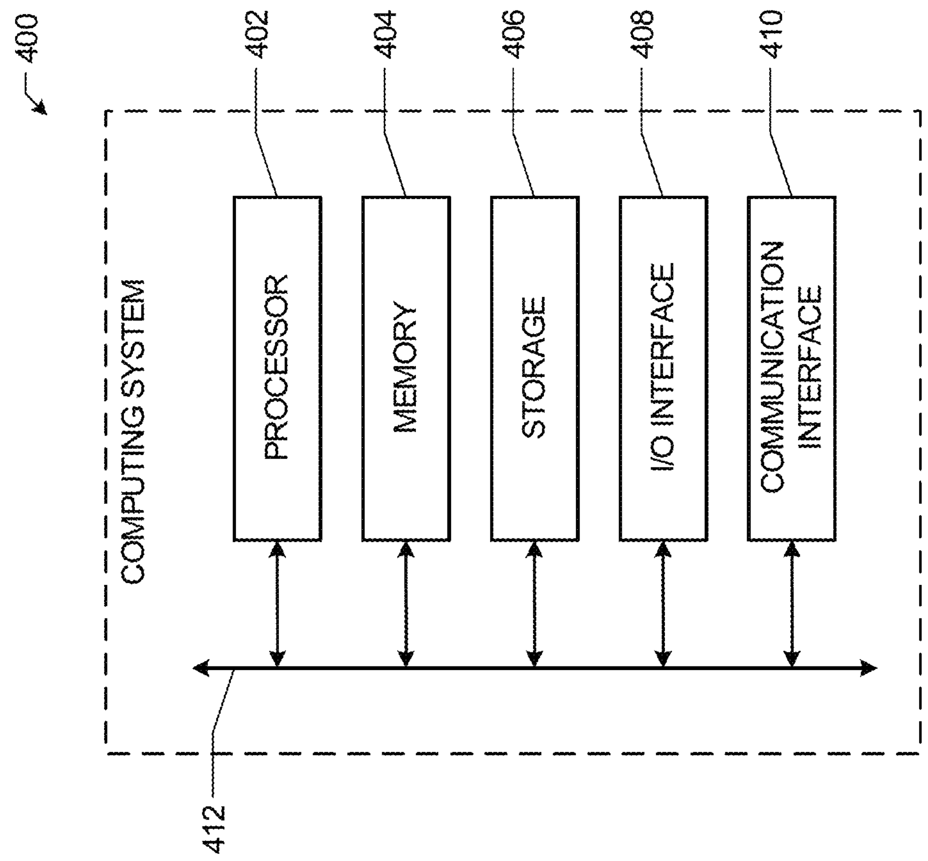
FIG. 4 illustrates an example computer system.

FIG. 4 illustrates an example computer system 400 that may be useful for identifying a precise localization and mapping of an altitudinal system with respect to dynamic surfaces, in accordance with the presently disclosed embodiments. In particular embodiments, one or more computer systems 400 perform one or more steps of one or more methods described or illustrated herein. In particular embodiments, one or more computer systems 400 provide functionality described or illustrated herein. In particular embodiments, software running on one or more computer systems 400 performs one or more steps of one or more methods described or illustrated herein or provides functionality described or illustrated herein. Particular embodiments include one or more portions of one or more computer systems 400. Herein, reference to a computer system may encompass a computing device, and vice versa, where appropriate. Moreover, reference to a computer system may encompass one or more computer systems, where appropriate.

This disclosure contemplates any suitable number of computer systems 400. This disclosure contemplates computer system 400 taking any suitable physical form. As example and not by way of limitation, computer system 400 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 400 may include one or more computer systems 400; be unitary or distributed; span multiple locations; span multiple machines; span multiple data centers; or reside in a cloud, which may include one or more cloud components in one or more networks. Where appropriate, one or more computer systems 400 may perform without substantial spatial or temporal limitation one or more steps of one or more methods described or illustrated herein.

As an example, and not by way of limitation, one or more computer systems 400 may perform in real time or in batch mode one or more steps of one or more methods described or illustrated herein. One or more computer systems 400 may perform at different times or at different locations one or more steps of one or more methods described or illustrated herein, where appropriate. In particular embodiments, computer system 400 includes a processor 402, memory 404, storage 406, an input/output (I/O) interface 408, a communication interface 410, and a bus 412. Although this disclosure describes and illustrates a particular computer system having a particular number of particular components in a particular arrangement, this disclosure contemplates any suitable computer system having any suitable number of any suitable components in any suitable arrangement.

In particular embodiments, processor 402 includes hardware for executing instructions, such as those making up a computer program. As an example, and not by way of limitation, to execute instructions, processor 402 may retrieve (or fetch) the instructions from an internal register, an internal cache, memory 404, or storage 406; decode and execute them; and then write one or more results to an internal register, an internal cache, memory 404, or storage 406. In particular embodiments, processor 402 may include one or more internal caches for data, instructions, or addresses. This disclosure contemplates processor 402 including any suitable number of any suitable internal caches, where appropriate. As an example, and not by way of limitation, processor 402 may include one or more instruction caches, one or more data caches, and one or more translation lookaside buffers (TLBs). Instructions in the instruction caches may be copies of instructions in memory 404 or storage 406, and the instruction caches may speed up retrieval of those instructions by processor 402.

Data in the data caches may be copies of data in memory 404 or storage 406 for instructions executing at processor 402 to operate on; the results of previous instructions executed at processor 402 for access by subsequent instructions executing at processor 402 or for writing to memory 404 or storage 406; or other suitable data. The data caches may speed up read or write operations by processor 402. The TLBs may speed up virtual-address translation for processor 402. In particular embodiments, processor 402 may include one or more internal registers for data, instructions, or addresses. This disclosure contemplates processor 402 including any suitable number of any suitable internal registers, where appropriate. Where appropriate, processor 402 may include one or more arithmetic logic units (ALUs); be a multi-core processor; or include one or more processors 602. Although this disclosure describes and illustrates a particular processor, this disclosure contemplates any suitable processor.

In particular embodiments, memory 404 includes main memory for storing instructions for processor 402 to execute or data for processor 402 to operate on. As an example, and not by way of limitation, computer system 400 may load instructions from storage 406 or another source (such as, for example, another computer system 400) to memory 404. Processor 402 may then load the instructions from memory 404 to an internal register or internal cache. To execute the instructions, processor 402 may retrieve the instructions from the internal register or internal cache and decode them. During or after execution of the instructions, processor 402 may write one or more results (which may be intermediate or final results) to the internal register or internal cache. Processor 402 may then write one or more of those results to memory 404. In particular embodiments, processor 402 executes only instructions in one or more internal registers or internal caches or in memory 404 (as opposed to storage 406 or elsewhere) and operates only on data in one or more internal registers or internal caches or in memory 404 (as opposed to storage 406 or elsewhere).

One or more memory buses (which may each include an address bus and a data bus) may couple processor 402 to memory 404. Bus 412 may include one or more memory buses, as described below. In particular embodiments, one or more memory management units (MMUs) reside between processor 402 and memory 404 and facilitate accesses to memory 404 requested by processor 402. In particular embodiments, memory 404 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 404 may include one or more memories 404, where appropriate. Although this disclosure describes and illustrates particular memory, this disclosure contemplates any suitable memory.

In particular embodiments, storage 406 includes mass storage for data or instructions. As an example, and not by way of limitation, storage 406 may include a hard disk drive (HDD), a floppy disk drive, flash memory, an optical disc, a magneto-optical disc, magnetic tape, or a Universal Serial Bus (USB) drive or a combination of two or more of these. Storage 406 may include removable or non-removable (or fixed) media, where appropriate. Storage 406 may be internal or external to computer system 400, where appropriate. In particular embodiments, storage 406 is non-volatile, solid-state memory. In particular embodiments, storage 406 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 406 taking any suitable physical form. Storage 406 may include one or more storage control units facilitating communication between processor 402 and storage 406, where appropriate. Where appropriate, storage 406 may include one or more storages 406. Although this disclosure describes and illustrates particular storage, this disclosure contemplates any suitable storage.

In particular embodiments, I/O interface 408 includes hardware, software, or both, providing one or more interfaces for communication between computer system 400 and one or more I/O devices. Computer system 400 may include one or more of these I/O devices, where appropriate. One or more of these I/O devices may enable communication between a person and computer system 400. As an example, and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 408 for them. Where appropriate, I/O interface 408 may include one or more device or software drivers enabling processor 402 to drive one or more of these I/O devices. I/O interface 408 may include one or more I/O interfaces 408, where appropriate. Although this disclosure describes and illustrates a particular I/O interface, this disclosure contemplates any suitable I/O interface.

In particular embodiments, communication interface 410 includes hardware, software, or both providing one or more interfaces for communication (such as, for example, packet-based communication) between computer system 400 and one or more other computer systems 400 or one or more networks. As an example, and not by way of limitation, communication interface 410 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 410 for it.

As an example, and not by way of limitation, computer system 400 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 400 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 400 may include any suitable communication interface 410 for any of these networks, where appropriate. Communication interface 410 may include one or more communication interfaces 410, where appropriate. Although this disclosure describes and illustrates a particular communication interface, this disclosure contemplates any suitable communication interface.

In particular embodiments, bus 412 includes hardware, software, or both coupling components of computer system 400 to each other. As an example and not by way of limitation, bus 412 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 412 may include one or more buses 412, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method for identifying a localization and mapping of an altitudinal system with respect to dynamic surfaces, by one or more computing devices, comprising:

receiving a time-dependent map of a patch of a dynamic surface over which a second altitudinal system is traversing, wherein the time-dependent map is captured by a first altitudinal system having a known location with respect to the dynamic surface and comprises a time-dependent topographical map of an area of the dynamic surface corresponding to a flightpath of the second altitudinal system, the time-dependent map being captured in real time by the first altitudinal system during traversal of the area by the second altitudinal system;

receiving a terrain map of a first set of terrain features of the patch of the dynamic surface, wherein the terrain map is captured by the second altitudinal system having an approximate location with respect to the dynamic surface, wherein the first set of terrain features comprises a plurality of terrain features of the dynamic surface directly beneath the second altitudinal system;

comparing the first set of terrain features to the time-dependent map of the patch of the dynamic surface over which the second altitudinal system is traversing;

identifying, based on the comparison of the first set of terrain features and the time-dependent map, a location of the second altitudinal system with respect to the dynamic-surface; and in response to identifying a location of the second altitudinal system with respect to the dynamic surface, navigating the second altitudinal system across the dynamic surface with the time-dependent map and the terrain map in environments lacking navigation aids, wherein the navigation aids comprise global positioning systems (GPS), radio-frequency (RF) beacons, or inertial navigation systems (INS).

2. The method of claim 1, further comprising:

prior to comparing the first set of terrain features to the time-dependent map, storing a second set of terrain features to a database, wherein the second set of terrain features comprises a plurality of terrain features of the dynamic surface captured over a period of time.

3. The method of claim 1, wherein the terrain map is captured and measured utilizing a terrain contour matching (TERCOM) technique.

4. The method of claim 1, wherein identifying the location of the second altitudinal system with respect to the dynamic surface further comprises:

determining, based on the comparison of the first set of terrain features and the time-dependent map, a match between the first set of terrain features and the time-dependent map; and in response to determining the match, identifying the location of the second altitudinal system with respect to the dynamic surface.

5. The method of claim 4, wherein identifying the location of the second altitudinal system with respect to the dynamic surface further comprises determining, based on a comparison of the first set of terrain features and the second set of terrain features, a match between the first set of terrain features and at least a subset of the second set of terrain features.

6. The method of claim 1, wherein the first altitudinal system comprises a satellite configured to capture the time-dependent map of the patch of the dynamic surface utilizing a synthetic aperture radar (SAR) system, and wherein the second altitudinal system comprises any system configured to measure the first set of terrain features of the patch of the dynamic surface when traversing thereover or thereon.

7. The method of claim 1, wherein the dynamic surface comprises an ocean surface, an upper surface of clouds, a lower surface of clouds, a desert surface, a beach surface, an upper surface of a forest, or an ice surface.

8. A computing system, comprising:

one or more non-transitory computer-readable storage media including instructions; and one or more processors coupled to the storage media, the one or more processors configured to execute the instructions to:

receive a time-dependent map of a patch of a dynamic surface over which a second altitudinal system is traversing, wherein the time-dependent map is captured by a first altitudinal system having a known location with respect to the dynamic surface and comprises a time-dependent topographical map of an area of the dynamic surface corresponding to a flightpath of the second altitudinal system, the time-dependent map being captured in real time by the first altitudinal system during traversal of the area by the second altitudinal system;

receive a terrain map of a first set of terrain features of the patch of the dynamic surface, wherein the terrain map is captured by the second altitudinal system having an approximate location with respect to the dynamic surface, wherein the first set of terrain features comprises a plurality of terrain features of the dynamic surface directly beneath the second altitudinal system;

compare the first set of terrain features to the time-dependent map of the patch of the dynamic surface over which the second altitudinal system is traversing;

identify, based on the comparison of the first set of terrain features and the time-dependent map, a location of the second altitudinal system with respect to the dynamic surface; and in response to identifying a location of the second altitudinal system with respect to the dynamic surface, navigate the second altitudinal system across the dynamic surface with the time-dependent map and the terrain map in environments lacking navigation aids, wherein the navigation aids comprise global positioning systems (GPS), radio-frequency (RF) beacons, or inertial navigation systems (INS).

9. The computing system of claim 8, wherein the instructions further comprise instructions to:

prior to comparing the first set of terrain features to the time-dependent map, store a second set of terrain features to a database, wherein the second set of terrain features comprises a plurality of terrain features of the dynamic surface captured over a period of time.

10. The computing system of claim 8, wherein the terrain map is captured and measured utilizing a terrain contour matching (TERCOM) technique.

11. The computing system of claim 8, wherein the instructions to identify the location of the second altitudinal system with respect to the dynamic surface further comprise instructions to:

determine, based on the comparison of the first set of terrain features and the time-dependent map, a match between the first set of terrain features and the time-dependent map; and in response to determining the match, identifying the location of the second altitudinal system with respect to the dynamic surface.

12. The computing system of claim 11, wherein the instructions to identify the location of the second altitudinal system with respect to the dynamic surface further comprise instructions to determine a match between the first set of terrain features and at least a subset of the second set of terrain features.

13. The computing system of claim 8, wherein the first altitudinal system comprises a satellite configured to capture the time-dependent map of the patch of the dynamic surface utilizing a synthetic aperture radar (SAR) system, and wherein the second altitudinal system comprises any system configured to measure the first set of terrain features of the patch of the dynamic surface when traversing thereover or thereon.

14. The computing system of claim 8, wherein the dynamic surface comprises an ocean surface, an upper surface of clouds, a lower surface of clouds, a desert surface, a beach surface, an upper surface of a forest, or an ice surface.

15. A non-transitory computer-readable medium comprising instructions that, when executed by one or more processors of a computing system, cause the one or more processors to:

receive a time-dependent map of a patch of a dynamic surface over which a second altitudinal system is traversing, wherein the time-dependent map is captured by a first altitudinal system having a known location with respect to the dynamic surface and comprises a time-dependent topographical map of an area of the dynamic surface corresponding to a flightpath of the second altitudinal system, the time-dependent map being captured in real time by the first altitudinal system during traversal of the area by the second altitudinal system;

receive a terrain map of a first set of terrain features of the patch of the dynamic surface, wherein the terrain map is captured by the second altitudinal system having an approximate location with respect to the dynamic surface, wherein the first set of terrain features comprises a plurality of terrain features of the dynamic surface directly beneath the second altitudinal system;

compare the first set of terrain features to the time-dependent map of the patch of the dynamic surface over which the second altitudinal system is traversing;

identify, based on the comparison of the first set of terrain features and the time-dependent map, a location of the second altitudinal system with respect to the dynamic-surface; and in response to identifying a location of the second altitudinal system with respect to the dynamic surface, navigate the second altitudinal system across the dynamic surface with the time-dependent map and the terrain map in environments lacking navigation aids, wherein the navigation aids comprise global positioning systems (GPS), radio-frequency (RF) beacons, or inertial navigation systems (INS).

16. The non-transitory computer-readable medium of claim 15, wherein the instructions further comprise instructions to:

prior to comparing the first set of terrain features to the time-dependent map, store a second set of terrain features to a database, wherein the second set of terrain features comprises a plurality of terrain features of the dynamic surface captured over a period of time.

17. The non-transitory computer-readable medium of claim 15, wherein the dynamic surface comprises an ocean surface, an upper surface of clouds, a lower surface of clouds, a desert surface, a beach surface, an upper surface of a forest, or an ice surface.

* * * * *